US012266498B2

(12) United States Patent
Omrane

(10) Patent No.: US 12,266,498 B2
(45) Date of Patent: Apr. 1, 2025

(54) ELECTRON EXIT WINDOW FOIL FOR ELECTRON BEAM EMITTER

(71) Applicant: TETRA LAVAL HOLDINGS & FINANCE S.A., Pully (CH)

(72) Inventor: Alaa Omrane, Lund (SE)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 0 days.

(21) Appl. No.: 18/249,771

(22) PCT Filed: Oct. 13, 2021

(86) PCT No.: PCT/EP2021/078346
§ 371 (c)(1),
(2) Date: Apr. 20, 2023

(87) PCT Pub. No.: WO2022/084123
PCT Pub. Date: Apr. 28, 2022

(65) Prior Publication Data

US 2023/0402245 A1 Dec. 14, 2023

(30) Foreign Application Priority Data

Oct. 21, 2020 (EP) ..................................... 20203181

(51) Int. Cl.
*H01J 33/04* (2006.01)
*B65B 55/08* (2006.01)

(52) U.S. Cl.
CPC .............. *H01J 33/04* (2013.01); *B65B 55/08* (2013.01)

(58) Field of Classification Search
CPC ..... H01J 33/04; H01J 2237/164; B65B 55/08; G21K 5/00
See application file for complete search history.

(56) References Cited

U.S. PATENT DOCUMENTS

2003/0094582 A1 5/2003 Weiss et al.
2007/0262690 A1 11/2007 Avnery et al.
(Continued)

FOREIGN PATENT DOCUMENTS

EP 0622979 A2 11/1994
EP 0480732 B1 12/1996
WO 2012074453 A1 6/2012

OTHER PUBLICATIONS

International Search Report (PCT/ISA/210) and Written Opinion (PCT/ISA/237) mailed on Jan. 14, 2022 by the European Patent Office as the International Searching Authority for International Application No. PCT/EP2021/078346. (13 pages).

*Primary Examiner* — Elmito Breval
(74) *Attorney, Agent, or Firm* — BUCHANAN INGERSOLL & ROONEY PC

(57) ABSTRACT

An electron exit window foil for an electron beam emitter having an electron beam generator and operating in a corrosive environment. The electron exit window foil has a sandwich structure with an outer side arranged to face the corrosive environment and an inner side arranged to face the electron beam generator. The sandwich structure comprises, as seen from the outer side to the inner side, a protective layer, for protecting the sandwich structure from the corrosive environment, a supporting layer made of Ti, for providing structural support for the sandwich structure, and a thermally conductive layer made of Al, for conveying heat from the sandwich structure.

19 Claims, 4 Drawing Sheets

(56) References Cited

U.S. PATENT DOCUMENTS

| | | | | |
|---|---|---|---|---|
| 2015/0028220 | A1* | 1/2015 | Poppi | B32B 37/12 156/60 |
| 2016/0307724 | A1* | 10/2016 | Poppi | C23C 28/345 |

* cited by examiner

ELECTRON EXIT WINDOW FOIL FOR ELECTRON BEAM EMITTER

TECHNICAL FIELD

The invention relates to an electron exit window foil for an electron beam emitter that operates in a corrosive environment. The invention also relates to an electron beam emitter that is arranged to emit electrons towards a package material to thereby kill microorganisms, to a food packaging machine having an electron beam emitter, and to a method for packing food in packages where the package material is irradiated by electrons from an electron beam emitter.

BACKGROUND ART

Electron beam emitters may be used to irradiate objects with electrons, e.g. for surface treatment. Such devices are commonly used within the food packaging industry where electron beams are providing efficient sterilization of packages, e.g. plastic bottles or packaging material to be later converted into a package.

A main advantage with electron beam sterilization is that wet chemistry, using e.g. $H_2O_2$(hydrogen peroxide), may be avoided thus reducing the high number of components and equipment required for such wet environments.

An electron beam emitter typically comprises a filament connected to a power supply, wherein the filament is emitting electrons. The filament is often referred to as an electron beam generator and is preferably arranged in high vacuum for increasing the mean free path of the emitted electrons, where an accelerator is directing the emitted electrons towards an exit window. The electron exit window is provided for allowing the electrons to escape from the electron beam emitter so they may travel outside the electron beam emitter and thus collide with the object to be sterilized and release its energy at the surface of the object.

The electron exit window typically has a thin electron-permeable foil that is sealed against the electron beam emitter for maintaining the vacuum inside the electron beam emitter. A cooled support plate (layer support structure) in the form of a grid is further provided for preventing the foil to collapse due to the high vacuum. Ti (titanium) is commonly used as the foil material due to its reasonably good match between high melting point and electron permeability, as well as the ability to provide thin films.

A problem with a Ti film is that it may oxidize, leading to reduced lifetime and operational stability. Oxidation happens since the film faces the atmosphere surrounding the electron beam emitter, which is a corrosive environment since air includes an amount of oxygen. Also oxidation, or corrosion, is also caused by the plasma created by the electrons in the air leaving the electron beam emitter.

In order to achieve a long lifetime of the exit window, a maximum temperature of approximately 250° C. should preferably not be exceeded during the operation of the electron beam emitter. Typically, a high performance electron beam emitter is designed to provide 22 kGy at up to 100 m/min at 80 keV when used for sterilizing packaging material in form of a running web. A plain Ti foil may thus not be used with such high performance electron beam emitters, since the amount of emitted electrons transmitted through the window may cause temperatures well above this critical value.

In filling machines, i.e. machines designed to form, fill packages with food product and thereafter seal the packages, sterilization is a crucial process not only for the packages, but for the machine itself. During such machine sterilization, which preferably is performed during start-up, the outside of the exit window is often exposed to the chemicals used for machine sterilization. A highly corrosive substance such as $H_2O_2$, which is commonly used for such applications, will affect the exit window by means of etching the Ti. Over time, as indicated, the oxygen in the atmosphere and/or plasma created by electrons may also oxidize the Ti.

Different solutions for improving the properties of the exit window have been proposed to overcome the above-mentioned drawbacks.

For example, patent document EP0480732B describes a window exit foil consisting of a Ti foil, and a protective layer of Al that is forming an intermetallic compound by thermal diffusion treatment of the Ti/Al construction. This solution may be suitable for relatively thick exit windows, i.e. windows allowing a protective layer being thicker than 1 micron.

Patent document EP0622979A discloses a window exit foil consisting of a Ti foil and a protective layer of silicon oxide on the side of the exit foil facing the object to be irradiated. Although the Ti foil may be protected by such layer, silicon oxide is very brittle and may easily crack in the areas where the foil is allowed to flex, i.e. the areas between the grids of the supportive plate when vacuum is provided. This drawback is making the foil of EP0622979A unsuitable for applications where the exit foil is exhibiting local curvatures, such as electron beam emitters using a grid-like cooling plate arranged in contact with the exit foil.

Thus, there is a need of improving electron exit window foils that are used for electron beam emitters, especially for such emitters that are used in the food industry for sterilizing package material and packages.

SUMMARY

It is an object of the invention to at least partly overcome one or more of the above-identified limitations of the prior art. In particular, it is an object to provide an electron exit window foil that is more durable than prior art foils, in particular such foils that are used for electron beam emitters that are employed for sterilizing package material and packages within the food industry.

According to a first aspect of the invention, an electron exit window foil for an electron beam emitter having an electron beam generator and operating in a corrosive environment is provided. The electron exit window foil has a sandwich structure with an outer side arranged to face the corrosive environment and an inner side arranged to face the electron beam generator. The sandwich structure comprises, as seen from the outer side to the inner side, a protective layer comprising metal, e.g. being made of a noble metal, for protecting the sandwich structure from the corrosive environment, a supporting layer made of Ti (titanium) for providing structural support for the sandwich structure, and a thermally conductive layer made of Al (aluminum), for conveying heat from the sandwich structure.

The electron exit window foil is advantageous in that the protective layer provides corrosive protection, the Ti layer provides the primary structural support and required stiffness of the sandwich structure, while the AL layer may serve to conduct and remove heat from the sandwich structure.

According to a second aspect an electron beam emitter is arranged to operate in a corrosive environment. The electron beam emitter comprises a housing, an electron beam generator arranged inside the housing, and a layer support structure that forms part of the housing and has openings for letting out electrons generated by the electron beam generator. An electron exit window foil according to the first aspect is arranged on the layer support structure for sealing the housing.

According to a third aspect a food packaging machine is provided, which is configured to fold package material into packages, fill the packages with a food product and seal the packages to contain the food product within the packages. The food packaging machine has an electron beam emitter according to the second aspect, which is arranged to emit electrons towards the package material to thereby kill microorganisms present on the package material.

According to a fourth aspect a method for packing food in packages is provided. The method comprises providing a package material, irradiating the package material with electrons to thereby kill microorganisms present on the package material, folding the package material into packages, filling the packages with a food product, and sealing the packages to contain the food product within the packages. The irradiating comprises irradiating the package material with an electron beam emitter according to the third aspect.

The electron beam emitter, the food packaging machine and the method for packing food in packages incorporates the electron exit window foil according to the first aspect and have the same advantages as the electron exit window foil, and may include all embodiments and variants of the electron exit window foil.

Other objectives, features, aspects and advantages of the invention will appear from the following detailed description as well as from the drawings.

BRIEF DESCRIPTION OF THE DRAWINGS

Embodiments of the invention will now be described, by way of example, with reference to the accompanying schematic drawings, in which.

DETAILED DESCRIPTION

Figure 1:
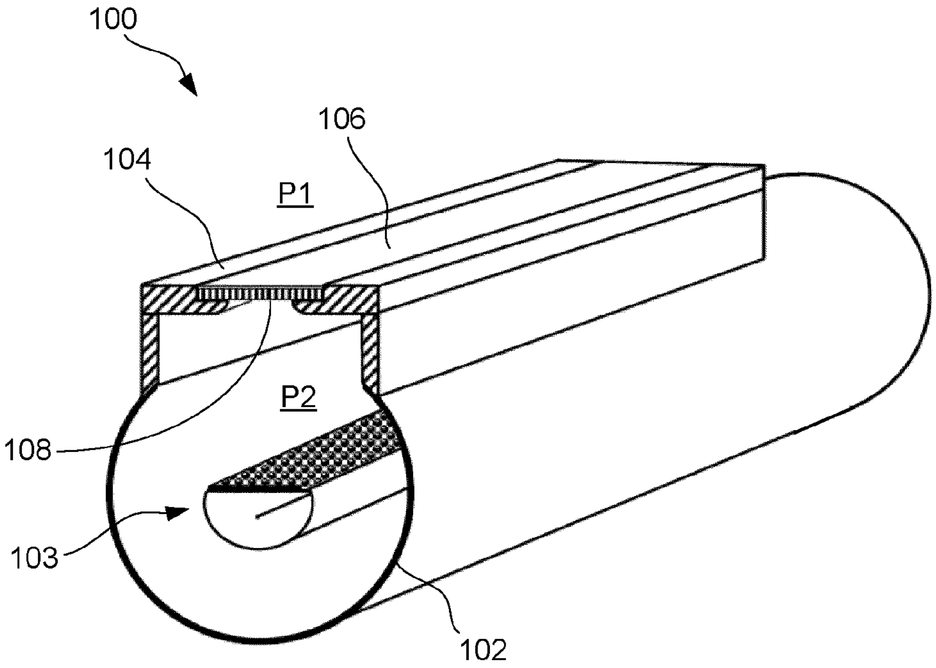
FIG. 1 is a perspective, cross sectional view of an electron beam emitter.

With reference to FIG. 1 an electron beam emitter 100 is shown. The electron beam emitter 100 comprises a tubular housing 102 that holds an electron beam generator 103 arranged to generate and shape an electron beam, and a supportive flange 104 carrying components relating to the output of the electron beam, such as an electron exit window foil 106 and a foil support plate 108 preventing the window foil 106 from collapsing as vacuum is established inside the emitter 100. Further, during operation of the electron beam emitter 100 the foil 106 is subject to excessive heat. Thereby, the foil support plate 108 also serves the purpose of leading away heat that is generated in the foil 106 when electrons passes through the foil 106. By keeping the foil temperature moderate, a relatively long lifetime of the foil 106 may be obtained. The electron beam generator 103 may be any suitable and commercially available electron beam generator.

Figure 2:
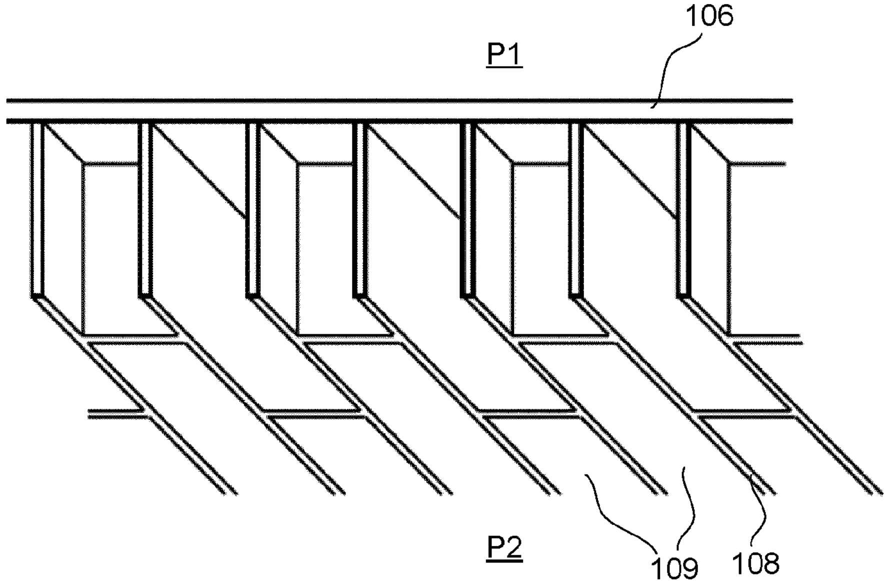
FIG. 2 is a cross-sectional view of an electron exit window foil and a layer support structure for the electron exit window foil.

With further reference to FIG. 2, the electron exit window foil 106 is arranged on the foil support plate 108. The foil support plate 108 is arranged to face the inside the electron beam emitter 100 such that vacuum maybe maintained on the inside of the exit window foil 106. The foil support plate 108 has openings 109 for allowing electrons to pass. In FIG. 2 P1 denotes the environment surrounding the electron beam emitter 100 having atmospheric pressure, while P2 denotes the vacuum on the inside the electron beam emitter 100. P1 is a corrosive environment since it contains air and thereby oxygen. Moreover, substances such as hydrogen peroxide may be present in environment P1 and may therefore come in contact with the exit window foil 106, and corrosive plasma may be created by electrons leaving the electron beam emitter 100.

During manufacturing, the foil support plate 108, being made of e.g. Cu (copper), is preferably attached to the flange 104 forming a part of the tube body 102. The flange 104 and the housing 102 are generally made of stainless steel. The electron exit window foil 106 is bonded onto the foil support plate 108 thus forming a foil-frame sub assembly. The foil-frame subassembly is subsequently attached to the tube body 102 to form a sealed housing.

With reference to FIG. 3*a-d*, different embodiments of an electron exit window foil 106*a-d* are shown. For all embodiments, the electron exit window foil 106*a-d* has a sandwich structure 107 with an outer side 2 arranged to face the corrosive environment P1 and an inner side 16 arranged to face the electron beam generator 103.

Figure 3A:
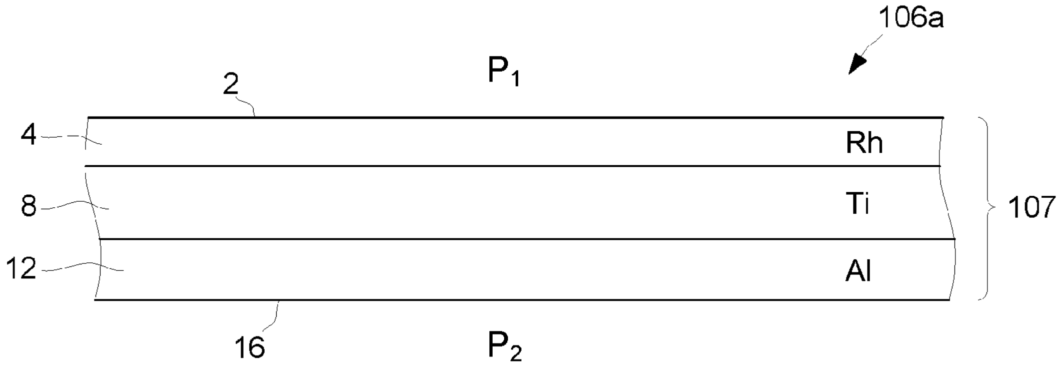
FIG. 3*a*-3*d* are schematic cross-sectional views of electron exit window foils according to different embodiments.

Starting with FIG. 3*a*, the foil 106*a* has a sandwich structure 107 which comprises, as seen from the outer side 2 to the inner side 16, a protective layer 4 comprising metal, e.g. being made of a noble metal, a supporting layer 8 made of Ti (titanium), and a thermally conductive layer 12 made of Al (aluminum). The primary function of the protective layer 4 is to protect the sandwich structure 107 from the corrosive environment P1. The primary function of the Ti layer 8 is to provide structural support and mechanical strength for the sandwich structure 107. The primary function of the Al layer 12 is to convey heat from the sandwich structure 107, in particular to the foil support plate 108. Of course, each of the layers 4, 8, 12 may provide additional and complementary functions.

The noble metal may be Rh (rhodium). Alternatively, the noble metal may be Ru (ruthenium), Pd (palladium), Ag (silver), Os (osmium), Ir (iridium), Pt (platinum) or Au (gold).

The protective layer 4 may have a thickness in the interval of 50 nm to 200 nm, or may have a thickness in the interval of 70 nm to 150 nm.

The Ti layer may have a thickness in the interval of 5000 nm to 8000 nm, or may have a thickness in the interval of 6500 nm to 7200 nm. The Al layer may have a thickness in the interval of 1000 nm to 3000 nm, or may have a thickness in the interval of 2500 nm to 3000 nm.

The layers 4, 8, 12 are attached to each other by suitable and conventional techniques. For example, the Ti layer 8 is may be a conventional foil made of Ti and may be manufactured by any suitable process. The protective layer 4 may be provided by means any suitable process, such as sputtering, thermal evaporation, etc., and should allow for providing a corrosive protection for the sandwich structure 107. The Al layer 12 may be provided by means any suitable process, such as sputtering, thermal evaporation, etc., and should allow for a sufficient improvement in thermal conductivity for lowering the temperature of the electron exit window foil 106*a* while still allowing the foil to bend into the apertures of the support plate 108 when vacuum is applied. Instead of Al another metal may be used for the heat conveying layer, such as Cu (copper), Ag (gold), Au (silver), or Mo (molybdenum), or alloys thereof.

By keeping the window foil 106 as thin as possible, using the thicknesses described above for the layers, the electron output is maximized. The thickness of the protective layer 4 should thus be designed such that it is capable of protecting the Ti layer from corrosion by hydrogen peroxide or other aggressive chemical agents which may be present in the particular application, and from corrosion caused by the plasma created by the electrons in the air. Further, the thickness of the protective layer 4 should ensure tightness and physical strength, such that Ti layer 8 is flexible in order to allow the entire foil to bend and conform to the apertures of the foil support plate 108 when vacuum is applied. A yet further parameter may be the density, for allowing electron transmittance through the protective layer 206.

By arranging the Al layer 12 and the protective layer 4 on opposite sides of the Ti foil, stress in the layers may be reduced. For example, when using Al as the thermally conductive layer and Rh as the protective layer, the Ti foil arranged in between those layers may reduce some of the stress induced upon heating. This is due to the fact that the coefficient of thermal expansion of Ti lies between the corresponding value of Al and Rh.

Figure 3B:
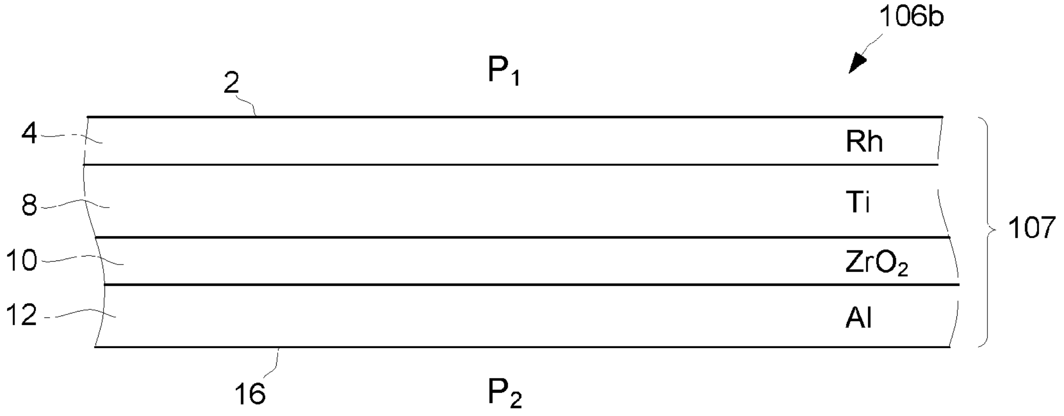

FIG. 3*b* shows another embodiment of an exit window foil 106*b*. Here, the sandwich structure 107 of the exit window foil 106*b* comprises a layer 10 made of $ZrO_2$ (zirconium dioxide) that is arranged between Ti layer 8 and the Al layer 12.

This $ZrO_2$-layer 10 is advantageous in that it provides for reducing or even preventing diffusion between the Ti layer 8 and the Al layer 12. It also achieves good adherence between the TI and AL layers. Alternatively, the layer 10 may be made of $Al_2O_3$ instead of $ZrO_2$. The prevention of diffusion and also reaction at the interface between the Ti AL layers stops formation of intermetallic compounds which may otherwise negatively change the characteristics of the materials. In the case of a thin Ti layer it may get reduced physical strength. Further, the presence of intermetallic compounds may reduce the thermal conductivity and the corrosion protective ability of the layers.

The $ZrO_2$ layer 10 between Ti layer 8 and the Al layer 12 may have a thickness in the interval of 10 nm to 30 nm, or may have a thickness in the interval of 15 nm to 20 nm. The $ZrO_2$ layer 10 may be provided by any suitable process, such as sputtering, thermal evaporation, etc.

Figure 3C:
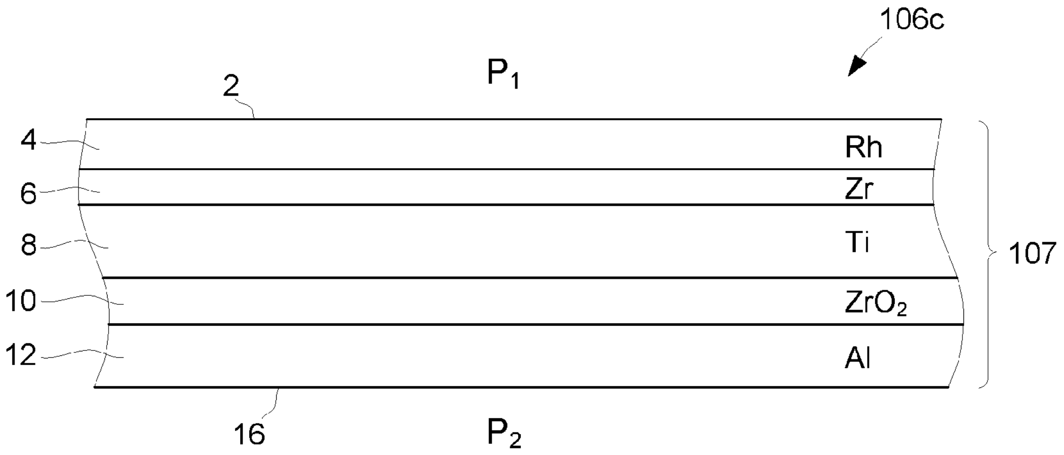

FIG. 3*c* shows another embodiment of an exit window foil 106*c*. Here, the sandwich structure 107 of the exit window foil 106*b* comprises a layer 6 made of Zr (zirconium) that is arranged between the protective layer 4 and the Ti layer 8. The Zr layer 6 acts primarily as a bonding layer between the protective layer 4 and the Ti layer 8. The Zr layer 6 may have a thickness in the interval of 5 nm to 15 nm, or may have a thickness in the interval of 8 nm to 12 nm.

Figure 3D:
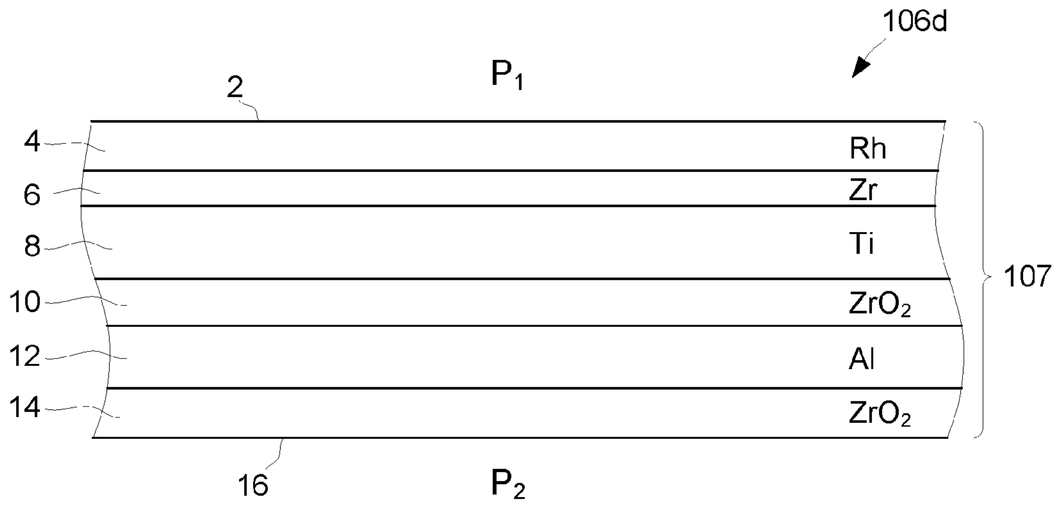

FIG. 3*d* shows another embodiment of an exit window foil 106*d*. Here, the sandwich structure 107 of the exit window foil 106*b* comprises a layer 14 made of $ZrO_2$ that is arranged on the Al layer 12, on the side of the Al-layer 12 that is arranged to face the electron beam generator 103. This layer 14 is advantageous in that it provides wear protection for the Al layer 12, since it is the layer that is closest to, i.e. abutting, the foil support plate 108. The $ZrO_2$ layer 14 that is arranged on the Al layer 12 may have a thickness in the interval of 100 nm to 200 nm, or may have a thickness in the interval of 130 nm to 170 nm.

Further embodiments of exit window foils are possible, such a foil where the sandwich structure 107 corresponds to FIG. 3*a*, with the Zr layer 6 in between the protective layer 4 and the Ti layer 8. Another embodiment corresponds to the embodiment of FIG. 3*a*, with the $ZrO_2$ layer 14 on the side of the Al layer that faces the electron beam generator 103. Another embodiment corresponds to the embodiment FIG. 3*b*, with the $ZrO_2$ layer 14 on the side of the Al layer that faces the electron beam generator 103.

Obviously, for all embodiments of the window foil 106 described herein the different layers are joined to each other to form a solid sandwich structure 107, i.e. there are no interspaces between the layers. For each embodiment of the window foil 106 there might be additional layers. Alternatively, for all embodiments of the window foil 106, the window foil 106 may not include any further layers than those explicitly mentioned herein.

As explained, the electron beam emitter 100 is typically arranged to operate in a corrosive environment P1. The electron beam emitter 100 comprises the housing 102, the electron beam generator 103 and the layer support structure 108 that forms part of the housing 102 and has openings 109 for letting out electrons 103 generated by the electron beam generator 100. An electron exit window foil according to any of the described embodiments is arranged on the layer support structure 108 for sealing the housing 102.

Figure 4:
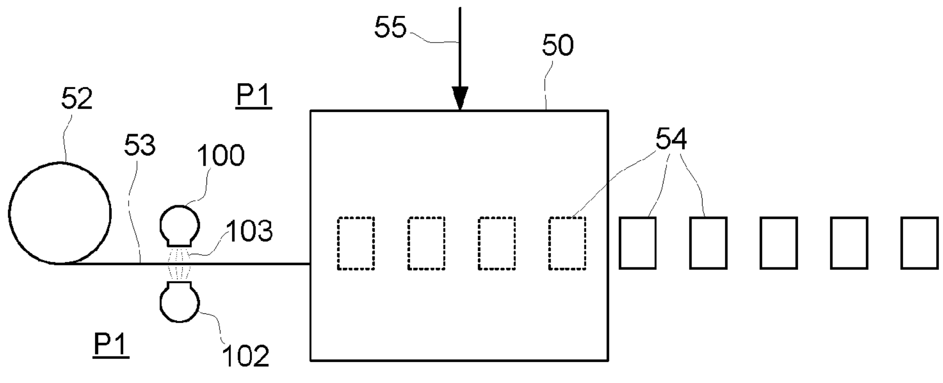
FIG. 4 is a schematic view of a food packaging machine.

With reference to FIG. 4, a food packaging machine 50 is illustrated. The machine 50 is a conventional food packaging machine and is configured to fold package material 53 into packages 54, fill the packages 54 with a food product 55 and seal the packages 54 to contain the food product 55 within the packages 54. The food product may be a liquid dairy based food product, juice or any other liquid or semi liquid food product. The package material 53 may be a web that is formed by a central cellulose based core layer that is coated with barrier layers, such as plastic layers.

The package material 53 may come in the form of a roll 52 that is unwound when the material 53 is fed into the machine 50. On both sides of the package material a respective electron beam emitter 100, 102 is arranged to emit electrons 103 towards the surface of the package material 53. The emitted electrons kill microorganisms that might be present on the package material 53, such that the package material is sterilized prior to folding it into a package and filling it with food product.

Figure 5:
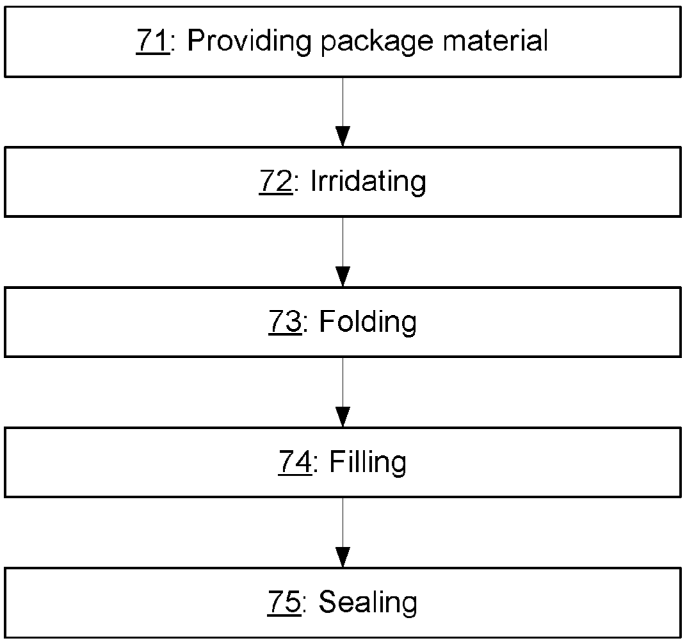
FIG. 5 is a flow chart illustrating a method for packing food in packages.

With reference to FIG. 5, a method for packing food 55 in packages 54 is illustrated. The method comprises providing 71 a package material 52, irradiating 72 the package material 53 with electrons 103 to thereby kill microorganisms present on the package material 53, folding 73 the package material 53 into packages 54, filling 74 the packages 54 with a food product 55, and sealing 75 the packages 54 to contain the food product 55 within the packages 54. This is typically done by using conventional methods and technology. However, the irradiating 72 comprises irradiating the package material 53 with an electron beam emitter 100 as described above, which comprises an electron exit window according to any of the embodiments previously described.

From the description above follows that, although various embodiments of the invention have been described and shown, the invention is not restricted thereto, but may also be embodied in other ways within the scope of the subject-matter defined in the following claims.

In one or more embodiments, the protective layer 4 as depicted in any of the figures, e.g. in FIGS. 3A, 3B, 3C and/or 3D, may comprise one or more of:

- a noble metal, a noble metal nitride, a noble metal carbide and/or a noble metal oxide, preferably wherein the noble metal is Rhodium, Rh, Ruthenium, Ru, Palladium, Pd, Silver, Osmium, Os, Iridium, Ir, Platinum, Pt, or Gold, Au, and/or
- Zirconium, Zr, Zirconium carbide, Zirconium nitride and/or Zirconium oxide, $ZrO_2$, and/or
- Titanium, Ti, Titanium carbide, Titanium nitride and/or Titanium oxide, and/or
- Tantalum, Ta, Tantalum carbide, Tantalum nitride and/or Tantalum oxide, and/or
- Niobium, Nb, Niobium carbide, Niobium nitride and/or Niobium oxide, and/or
- Hafnium, Hf, Hafnium carbide, Hafnium nitride and/or Hafnium oxide, and/or
- Chromium, Cr, Chromium carbide, Chromium nitride and/or Chromium oxide, and/or
- Nickel, Ni, Nickel carbide, Nickel nitride and/or Nickel oxide, and/or
- Molybdenum, Mo, Molybdenum carbide, Molybdenum nitride and/or Molybdenum oxide.

For example, the protective layer 4 may comprise two or more of the aforementioned elements, e.g. the protective layer 4 may comprise (or may be made of) a combination, e.g. an alloy or any other type of chemical and physical combination, of:

- Titanium, Tantalum and Hafnium, and/or
- Titanium, Tantalum, Hafnium, Zirconium, and/or
- Titanium, Tantalum, Niobium, and/or
- Titanium, Zirconium, Hafnium, Niobium, Tantalum.

The protective layer 4 may be made of a metal, metal nitride and/or metal oxide. For example, the protective layer 4 may be made of one or more metals, metal nitrides and/or metal oxides as described above. Optionally, the protective layer 4 may be made of a noble metal, a noble metal nitride and/or noble metal oxide, wherein the noble metal is Rhodium, Rh, Ruthenium, Ru, Palladium, Pd, Silver, Osmium, Os, Iridium, Ir, Platinum, Pt, or Gold, Au.

The invention claimed is:

1. An electron exit window foil for an electron beam emitter having an electron beam generator and operating in a corrosive environment, the electron exit window foil having a sandwich structure with an outer side arranged to face the corrosive environment and an inner side arranged to face the electron beam generator, the sandwich structure comprising, as seen from the outer side to the inner side,

- a protective layer comprising metal, for protecting the sandwich structure from the corrosive environment,
- a supporting layer made of Ti, for providing structural support for the sandwich structure,
- a thermally conductive layer made of Al, for conveying heat from the sandwich structure, the Al layer including one side facing away from the Ti layer and an opposite side facing toward the Ti layer; and
- the sandwich structure comprising a layer made of $ZrO_2$ that is arranged on the Al layer, on the one side of the Al layer that faces away from the Ti layer and that is arranged to face the electron beam generator.

2. The electron exit window foil according to claim 1, wherein the sandwich structure comprises

- a layer made of $ZrO_2$ that is arranged between the Ti layer and the Al layer, for reducing diffusion between the Ti layer and the Al layer.

3. The electron exit window foil according to claim 2, wherein the $ZrO_2$ layer between the Ti layer and the Al layer has a thickness of 10 nm to 30 nm, or has a thickness of 15 nm to 20 nm.

4. The electron exit window foil according to claim 1, wherein the sandwich structure comprises

- a layer made of Zr that is arranged between the protective layer and the Ti layer, for acting as a bonding layer between the protective layer and the Ti layer.

5. The electron exit window foil according to claim 4, wherein the Zr layer has a thickness of 5 nm to 15 nm, or has a thickness of 8 nm to 12 nm.

6. The electron exit window foil according to claim 1, wherein the protective layer comprises one or more of:

- a noble metal, a noble metal nitride, a noble metal carbide and/or a noble metal oxide, preferably wherein the noble metal is Rhodium, Rh, Ruthenium, Ru, Palladium, Pd, Silver, Osmium, Os, Iridium, Ir, Platinum, Pt, or Gold, Au, and/or
- Zirconium, Zr, Zirconium carbide, Zirconium nitride and/or Zirconium oxide, $ZrO_2$, and/or
- Titanium, Ti, Titanium carbide, Titanium nitride and/or Titanium oxide, and/or
- Tantalum, Ta, Tantalum carbide, Tantalum nitride and/or Tantalum oxide, and/or
- Niobium, Nb, Niobium carbide, Niobium nitride and/or Niobium oxide, and/or
- Hafnium, Hf, Hafnium carbide, Hafnium nitride and/or Hafnium oxide, and/or
- Chromium, Cr, Chromium carbide, Chromium nitride and/or Chromium oxide, and/or
- Nickel, Ni, Nickel carbide, Nickel nitride and/or Nickel oxide, and/or
- Molybdenum, Mo, Molybdenum carbide, Molybdenum nitride and/or Molybdenum oxide, and/or
- a combination of Titanium, Tantalum, Hafnium, and/or
- a combination of Titanium, Tantalum, Hafnium, Zirconium, and/or
- a combination of Titanium, Tantalum, Niobium, and/or
- a combination of Titanium, Zirconium, Hafnium, Niobium, Tantalum.

7. The electron exit window foil according to claim 1, wherein the protective layer has a thickness of 50 nm to 200 nm, or has a thickness of 70 nm to 150 nm.

8. The electron exit window foil according to claim 1, wherein the Ti layer has a thickness of 5000 nm to 8000 nm, or has a thickness of 6500 nm to 7200 nm.

9. The electron exit window foil according to claim 1, wherein the Al layer has a thickness of 1000 nm to 3000 nm, or has a thickness of 2500 nm to 3000 nm.

10. The electron exit window foil according to claim 1, wherein the $ZrO_2$ layer that is arranged on the Al layer on a side facing the electron beam generator has a thickness of 100 nm to 200 nm, or has a thickness of 130 nm to 170 nm.

11. An electron beam emitter arranged to operate in a corrosive environment, comprising

- a housing,
- an electron beam generator arranged inside the housing,
- a layer support structure that forms part of the housing and has openings for letting out electrons generated by the electron beam generator, and
- arranged on the layer support structure for sealing the housing, an electron exit window foil according to claim 1.

12. A food packaging machine configured to fold package material into packages, fill the packages with a food product and seal the packages to contain the food product within the packages, the food packaging machine comprising an electron beam emitter arranged to emit electrons towards the package material to thereby kill microorganisms present on the package material, wherein the electron beam emitter is an electron beam emitter according to claim 11.

13. A method for packing food in packages, the method comprising providing a package material, irradiating the package material with electrons to thereby kill microorganisms present on the package material, folding the package material into packages, filling the packages with a food product, and sealing the packages to contain the food product within the packages, wherein the irradiating comprises irradiating the package material with an electron beam emitter according to claim 11.

14. The electron exit window foil according to claim 1, wherein the protective layer is made of a metal, metal nitride and/or metal oxide, preferably wherein the metal is a noble metal such as Rhodium, Rh, Ruthenium, Ru, Palladium, Pd, Silver, Osmium, Os, Iridium, Ir, Platinum, Pt, or Gold, Au.

15. The electron exit window foil according to claim 1, wherein the protective layer is made of a metal, metal nitride and/or metal oxide, the metal being a noble metal such as Rhodium, Rh, Ruthenium, Ru, Palladium, Pd, Silver, Osmium, Os, Iridium, Ir, Platinum, Pt, or Gold, Au.

16. An electron exit window foil for an electron beam emitter having an electron beam generator and operating in a corrosive environment, the electron exit window foil having a sandwich structure with an outer side arranged to face the corrosive environment and an inner side arranged to face the electron beam generator, the sandwich structure comprising, as seen from the outer side to the inner side, a protective layer comprising metal for protecting the sandwich structure from the corrosive environment, the protective layer being an outermost layer of the electron exit window foil;

a supporting layer made of Ti providing structural support for the sandwich structure;

a thermally conductive layer made of Al that conveys heat from the sandwich structure, the Al layer including one side facing away from the Ti layer and an opposite side facing toward the Ti layer; and a layer made of $ZrO_2$ that is arranged on the Al layer and on the one side of the Al layer that faces away from the Ti layer and that is arranged to face the electron beam generator so that the $ZrO_2$ layer is an innermost layer of the electron exit window foil, the $ZrO_2$ layer having a thickness of 100 nm to 200 nm.

17. The electron exit window foil according to claim 16, further comprising a layer made of Zr positioned between and in contact with the Rh protective layer and the Ti layer.

18. The electron exit window foil according to claim 17, further comprising a layer made of $ZrO_2$ positioned between and in contact with the Al layer and the Ti layer.

19. The electron exit window foil according to claim 16, further comprising a layer made of $ZrO_2$ positioned between and in contact with the Al layer and the Ti layer.

* * * * *